United States Patent Office 2,993,301
Patented July 25, 1961

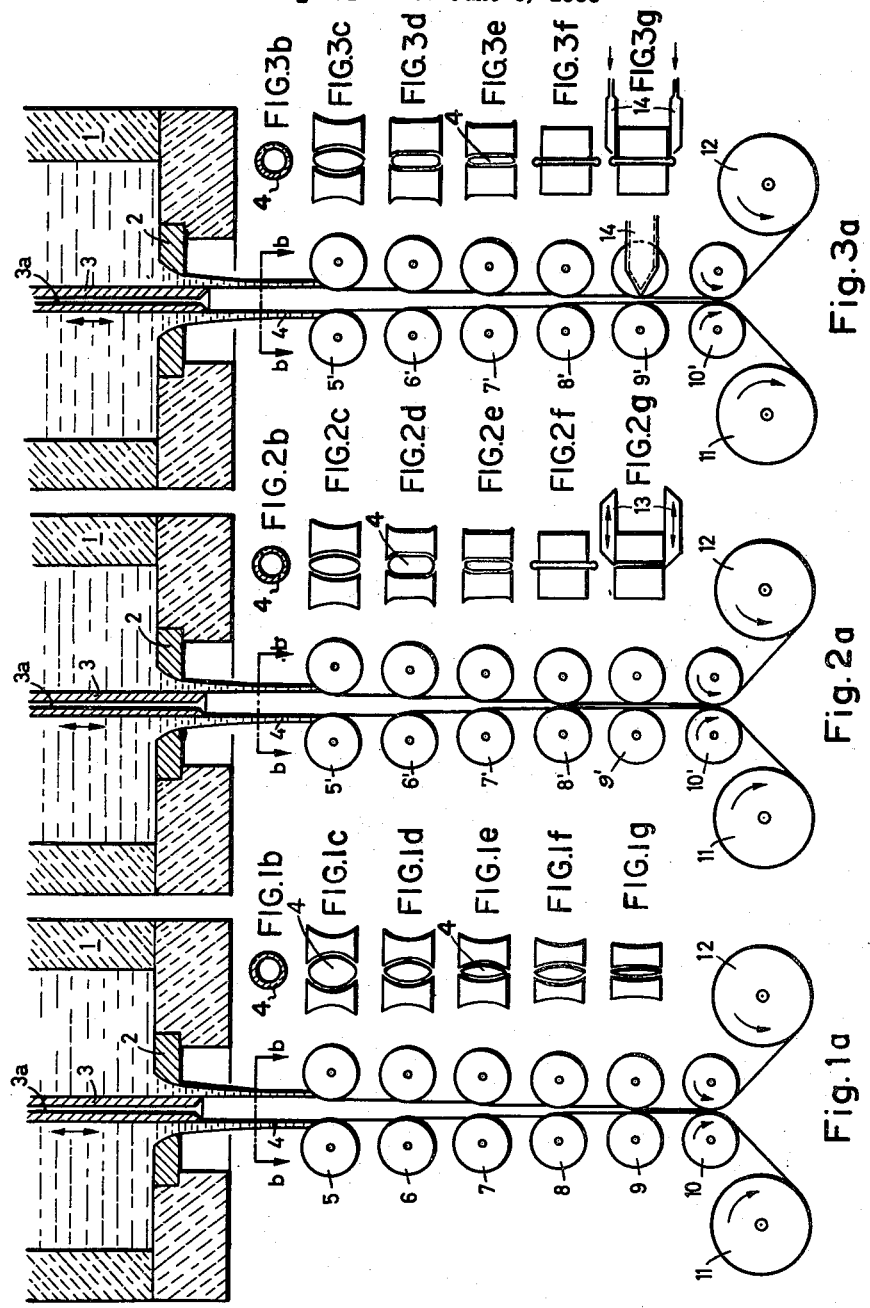

2,993,301
APPARATUS AND PROCESS FOR MAKING GLASS FOIL
Hans Joachim Müller, Munich, and Walter Hänlein, Erlangen, Germany, assignors to Siemens-Schuckert-werke Aktiengesellschaft, Berlin-Siemensstadt, Germany, a corporation of Germany
Original application June 3, 1955, Ser. No. 513,036, now Patent No. 2,910,805, dated Nov. 3, 1959. Divided and this application July 30, 1959, Ser. No. 830,653
Claims priority, application Germany June 4, 1954
8 Claims. (Cl. 49—3)

This application is a division of our application Serial No. 513,036 filed June 3, 1955, issued as U.S. Patent No. 2,910,805.

The present invention relates to apparatus and to a new, continuous method of producing glass foil.

When building transformers and electromotors as well as other electrical apparatus, relatively thin insulating bands or insulating foils, as well as layers of insulating foil, are required. The foils should consist of material that is readily workable and, in addition, is heat stable in use, and is economic. Glass foils of very low thickness would be particularly suitable for these purposes, because such glass foils are very flexible and are characterized by excellent insulating properties. Prior attempts, however, to extrude such glass foils, of lowest possible thickness, from a slotted nozzle, have been unsuccessful because, due to the effect of surface tension, the flat strip of glass emerging from the slot becomes constricted. The action of the surface tension causes, particularly, a thickening of the edges, the elimination of which is very difficult.

It is one of the objects of this invention to provide a continuous method for making glass foils whereby the afore-mentioned difficulties are avoided.

It is another object to provide apparatus designed for the continuous production of glass foil.

It is a still further object to provide glass foil of minute thickness and high flexibility made according to the method of this invention for various industrial purposes, particularly as insulating material for transformers, electromotors and other electrical apparatus.

To this end, according to the present invention, a glass tube of predetermined diameter and relatively minute wall thickness is drawn from a glass melt, the diameter of the glass tube is then gradually reduced in one direction and, finally, the glass tube flattened in this manner is severed into two parts, transversely to the direction of the diminished diameter.

The herein disclosed method can be practised in several different ways. In method or embodiment 1 the glass tube drawn from the melt is gradually flattened by passing it between rollers that exceed the width of the flattened glass tube. By means of additional rollers, the flattened, or partially flattened, glass tube can be exposed to a pressure at the edges that exceeds the pressure at which the glass will bend into a curvature of smallest radius. If, moreover, the flattened glass tube has been sufficiently cooled, it will break at the edges and be severed into two halves. If, on the other hand, rollers are employed that are somewhat shorter than the width of the flattened glass tube, as in methods 2 and 3, the operation produces hollow bulges at the edges which, in order to cut the flattened tube in two, may be severed by means of impact forces, such as breaking or severing discs or knives or jets of compressed air.

The novel features which we consider characteristic of our invention, are set forth with particularity in the appended claims. The invention itself, however, and any additional object and advantages thereof, will best be understood from the following description of several preferred embodiments when read in conjunction with the accompanying schematic drawings, in which:

FIG. 1a is a vertical partly diagrammatic view of embodiment 1, the view comprising a vertical section of the vessel containing the glass melt and a front elevation of a plurality of roller pairs;

FIG. 1b is a section at line b—b of FIG. 1a;

FIGS. 1c to 1g are partial and diagrammatic views comprising top views of the drawing rollers of FIG. 1a illustrated adjacent thereto; for simplification the tube 4 is shown in outline, unsectioned;

FIG. 2a is likewise a vertical partly diagrammatic view of embodiment 2, in which hollow bulges are formed at the edges, which are broken or severed off by cutting discs or rollers, for example;

FIG. 2b is a section at line b—b of FIG. 2a;

FIGS. 2c to 2f are likewise partial and diagrammatic views comprising top views of the adjacent drawing rollers of FIG. 2a illustrated adjacent thereto;

FIG. 2g is a similarly taken view of rollers 9' but illustrates reciprocating severing knives;

FIGS. 3a to 3g are similarly taken views of embodiment 3, which differs from embodiment 2 (of FIGS. 2a to 2g) in the use of a jet of compressed gas to break away the hollow bulges at the edges.

In all three embodiments, the melting vessel 1 consisting of highly heatproof material, such as refractory tile, is provided with an annular discharge nozzle at the bottom. This nozzle consists preferably of a molybdenum ring 2 with a nozzle-like opening that is circular in cross section. The nozzle is provided with a cylindrical mandrel 3, preferably also made of molybdenum. This mandrel has a coaxial duct 3a through which, during the drawing process, an inert gas is blown at slightly increased pressure in order to keep inner walls of the glass tube apart from each other while the tube is flattened during the drawing process. The mandrel 3 is mounted concentrically with respect to the nozzle opening. Because of the tapered shape of the nozzle, upon displacing the mandrel 3 along the axis, the wall thickness of the glass tube 4 emerging from the nozzle can be adjusted as desired. For this reason we prefer a mounting of mandrel 3 which permits adjustments either at the beginning or during the drawing process.

The glass tube 4 emerging from the nozzle is passed between the nip of several pairs of drawing rollers and is thereby increasingly profiled, i.e., the tube is more and more flattened. Although their number may, obviously, be changed, the illustrated embodiments provide altogether six pairs of drawing rollers 5 to 10 and 5' to 10', respectively. The roller pair previous to the last, and which severs the glass tube into two glass foils, may be called the separating rollers, while the purpose of the last roller pair 10 and 10' is more or less only that of transferring the two halves of the severed tube.

The nozzle-shaped discharge opening 2 in the bottom plate of the melting trough is kept closed in any customary manner, say, by means of a plug, until the glass is thoroughly liquefied. After removal of the closure, the mandrel 3 is inserted into the opening. At the same time an inert gas, such as nitrogen, is blown at slight overpressure into the duct 3a of the mandrel. The glass tube 4 emerging from the nozzle has an annular cross section, as shown at b, before it enters into the nip between the first roller pair. By means of the roller pairs 5 to 9 the glass tube is increasingly flattened in the direction of one diameter so that it increases correspondingly in width, transversely to this diameter. For this purpose the rollers of the roller pairs 5—9 are profiled in appropriate steps as may be seen from partial FIGS. c–g.

According to the embodiment shown in FIG. 1, the glass tube is gradually flattened until it assumes the shape of a relatively flat ellipse at the roller pairs 8 and 9, respectively. Thus the flattening process is stopped before the walls come in contact with each other in the plane of the main axis of the ellipse. The length of the rollers must be adjusted in this case according to the gradually increasing diameter of the tube. Moreover, the timing of the drawing process must be such that the tube, upon entering into the nip of roller pair 9, is sufficiently cooled below the solidification point. The pressure exerted by roller paid 9 upon the edges of the tube, which at this time has been rolled into an almost flat shape, is adjusted so as to exceed the breaking pressure, with the result that at the vertices the tube is severed into two separate bands. Accordingly, the length of the roller pair 9 is adjusted to the width of the resulting double band, or better, is adjusted so as to slightly exceed that width. Leaving roller pair 9, the severed double band enters between the roller pair 10 whereafter one of the bands is wound up at spool 11 and the other at spool 12. Obviously, it is necessary to synchronize the speed at which the individual roller pairs are driven and, particularly, the windup speed of spools 11 and 12. The gas blown at slight overpressure into the mandrel 3 and from there into the tube is retained inside the tube until the latter is split open at the edges. Thus according to the embodiment shown in FIG. 1, the tube retains the inert gas until passing the roller pair 9 and the gas can readily escape from in between the split tube emerging from roller pair 9.

The fact that the resulting foils or bands are slightly curved has no influence on the windup; the foils are very flexible and are readily straightened out at roller pair 10 or in winding.

The object of the present invention is accomplished in a somewhat different manner by means of the device shown in FIG. 2. There, the roller pairs 5'—10' have different profiles and differ in length from those in FIG. 1.

The initial steps are the same as the steps described in connection with FIG. 1. The cylindrical glass tube, still in a plastic state, is increasingly flattened, but into a plane-parallel instead of an oval hollow body. Upon passing through roller pair 8', the tube is flattened to such an extent that the inner surfaces almost touch each other. This is accomplished by use of rollers that, except for the roller pair 5', are mainly cylindrical, instead of having the profiled surfaces of the rollers in FIG. 1. Moreover, the roller pair 8' is of a length that is insufficient to retain therebetween all of the increased width of the flattened tube. As a result, marginal sections of the tube in form of hollow bulges protrude laterally at the rollers. Passing between the next roller pair 9', the tube is completely flattened. The drawing process is thereby timed in such a manner that, at roller pair 9', the tube is sufficiently solidified so that, even if the walls should touch each other, they will no longer stick to each other. The protruding hollow edges 4a are cut off at roller pair 9' by means of sharp-edged discs or vibrating or other reciprocating means in form of separating knives 13 (FIG. 2g) working synchronously with roller pair 9'. Again, the two bands or foils resulting in this manner are wound upon spools 11 and 12 as previously described.

In order to sever the afore-described hollow bulges, jets of compressed air may be used instead of disc or separating knives. In this manner the hollow bulges are blown off, as it were. A side view and a top view of an embodiment of this type are shown in FIG. 3, in connection with roller pair 9'. As may be seen from the drawing, a pair of air-pressure nozzles 14 is arranged alongside the faces of roller pair 9'. The individual air pressure nozzles are tapered in a manner so as to blow compressed air in a narrow stream against the bulges 4a in order to sever them from the flattened glass tube and thus separate the flattened tube into two foils.

According to FIGS. 2 and 3, the gas entering into the tube from mandrel 3 escapes when the hollow bulges 4a are separated at the roller pair 9' and an opening for the escape of the gas is provided thereby.

In order to produce glass foils in this manner, different types of glass may be used. Hard glass having a softening point of about 700 to 800° C., or quartz glass having a softening point of about 1000 to 1100° C. has been found particularly suitable. The type of glass depends, among other things, upon the ultimate use of the foil and particularly upon the degree of heat resistance required of insulation material made from the foil. Generally, when using glass foils made according to this invention, they may be heated close to the softening point; i.e. in case of glass foils from hard glass to about 700° C. and in case of foils from quartz glass to about 1000° C.

As previously mentioned, by means of adjusting the mandrel 3, the initial thickness of the walls of the glass tube and thus the thickness of the resulting foils can be satisfactorily adjusted. Additional adjustments of the foil thickness are possible by regulating the rotational speed of roller pairs. The foils should be as thin as possible; preferably the foils should have a thickness of below 100 microns. Glass foils being 20 to 30 microns thick are particularly desirable. For many purposes, foils having a still lower thickness, for example a thickness of 10 microns, may be produced in this manner.

We claim:

1. Method for the production of glass foil, comprising preparing a glass melt, continuously drawing a thin-walled plastic glass tube from the melt, stepwise-pressing said tube into a flat tube with protruding hollow bulges at the longitudinal edges while passing into the tube a gas at a pressure sufficient to prevent the tube from collapsing while said pressing into a flat tube takes place, permitting the flat tube to cool to solidify it, parting said protruding longitudinally extending solidified hollow bulges from the tube.

2. Method for the production of glass foil, comprising preparing a glass melt, continuously drawing a thin-walled plastic glass tube from the melt, pressing said tube into a flat tube with protruding hollow bulges at the longitudinal edges while passing into the tube a gas at a pressure sufficient to prevent the tube from collapsing while said pressing into a flat tube takes place, permitting the flat tube to cool to solidify it before the walls come in contact with each other in the plane of the main axis of the tube, parting said protruding longitudinally extending hollow solidified bulges from the tube to separate the two parts of the tube into two glass foils.

3. Method for the production of glass foil, comprising continuously drawing a thin-walled plastic glass tube from a glass melt, stepwise-pressing said tube into a flat tube with protruding hollow bulges at the longitudinal edges while passing into the flat tube and into the bulges a gas at a pressure sufficient to prevent the tube from collapsing while said pressing into a flat tube takes place, permitting the flat tube to cool to solidify it before the walls come in contact with each other in the plane of the main axis of the tube, parting said protruding longitudinally extending hollow bulges from the tube to release the gas from the bulges and the tube, and separately removing the resulting two flat parts of the tube, thereby providing two glass foils.

4. Method for the production of glass foil, comprising preparing a glass melt, continuously drawing a thin-walled plastic glass tube from the melt, stepwise-pressing said tube into a flat tube with protruding hollow bulges at the longitudinal edges while passing into the tube a stream of gas at a pressure sufficient to prevent the tube from collapsing while said pressing into a flat tube takes place, permitting the flat tube to cool to solidify it, parting said protruding longitudinally extending solidified hollow bulges from the tube, said parting being carried out by projecting jets of compressed gas transversely against the bulges of the longitudinal edges.

5. Apparatus for the continuous and simultaneous production of two sheets of glass foil, comprising a refractory vessel for melting glass, means permitting the withdrawing of a plastic glass tube at the bottom of the vessel, said means including a downwardly extending nozzle and means having a gas-inlet duct which is longitudinal to and in said nozzle, a plurality of roller pairs arranged below said nozzle, one pair below another, the pairs of rollers providing spaced apart opposed surfaces for contacting opposite areas of the wall of the plastic tube, the opposed surfaces of the lower pairs being closer together than those of the upper pairs, whereby the plastic glass tube drawn from the nozzle and down between the roller pairs is increasingly made flatter and thereby formed into a tube having lengthwise extending longitudinal edges, and means for parting the said tube at the longitudinal edges to provide two sheets of glass foil, the degree of spacing apart of the opposed surfaces of each roller pair co-acting with the pressure of the gas from the means having a gas-inlet duct to keep the opposite inner walls of the flattened tube apart at least until they are sufficiently solidified so that they will not stick together, and means for separating the two sheets, the pairs of rollers including a bulge forming pair disposed in the path of the flattened tube, which pair has surfaces which are narrower transversely than the flattened resulting tube, to form transversely outwardly extending longitudinally directed hollow bulges on the lengthwise extending edges of the tube, the parting means serving to part the bulges from the tube to provide said two sheets, and to vent said gas.

6. The apparatus defined in claim 5 in which the parting means comprises a roller pair having cutting means at each side of said pair.

7. The apparatus defined in claim 5, in which the parting means comprises an additional roller pair of substantially the same width as the bulge-forming pair, and a nozzle for compressed gas at each side of said additional pair.

8. Apparatus for the continuous and simultaneous production of two sheets of glass foil, comprising a refractory vessel for melting glass, means permitting the withdrawing of a plastic glass tube from the vessel, said means including a nozzle and a mandrel having a gas-inlet duct which is longitudinal to and is inserted into said nozzle, a plurality of roller pairs in serial and downward arrangement with respect to the nozzle and each other, the pairs of rollers providing spaced apart opposed surfaces for contacting the plastic tube, the opposed surfaces of the pairs farther from the nozzle being closer together than those of the nearer pairs, whereby the plastic glass tube drawn from the nozzle between the roller pairs is increasingly made flatter, all of said pairs being a sufficient distance apart to avoid pressing the opposite inner surfaces into contact, thereby forming a tube having a lengthwise extending unobstructed passage and longitudinal edges, means for breaking the said longitudinal edges to provide two continuous sheets of glass foil, one of said pairs of rollers pressing against opposite faces of the tube along substantially the entire transverse width of the resulting sheets, while the breaking takes place, the degree of spacing apart of the opposed surfaces of each roller pair co-acting with the gas from the mandrel to keep the opposite walls of the flattened tube apart at least until they are sufficiently solidified so that they will not stick together, and means for separate removal of the two sheets.

References Cited in the file of this patent
UNITED STATES PATENTS

| | | |
|---|---|---|
| 2,172,899 | Barnard | Sept. 12, 1939 |
| 2,342,891 | Powers | Feb. 29, 1944 |
| 2,386,511 | Slayter et al. | Oct. 9, 1945 |
| 2,457,785 | Slayter et al. | Dec. 28, 1948 |
| 2,910,805 | Muller et al. | Nov. 3, 1959 |